US007774943B2

(12) United States Patent
Ireland

(10) Patent No.: US 7,774,943 B2
(45) Date of Patent: Aug. 17, 2010

(54) KNIFE

(75) Inventor: William Alfred Ireland, Churchdown (GB)

(73) Assignee: WA1 Designs Limited (GB)

( * ) Notice: Subject to any disclaimer, the term of this patent is extended or adjusted under 35 U.S.C. 154(b) by 170 days.

(21) Appl. No.: 11/709,517

(22) Filed: Feb. 22, 2007

(65) Prior Publication Data

US 2007/0240314 A1 Oct. 18, 2007

(30) Foreign Application Priority Data

Feb. 28, 2006 (GB) ................................ 0603908.5

(51) Int. Cl.
*B23B 1/00* (2006.01)

(52) U.S. Cl. ............................. 30/162; 30/335; 30/336

(58) Field of Classification Search .................. 30/162, 30/125, 337, 336
See application file for complete search history.

(56) References Cited

U.S. PATENT DOCUMENTS

| | | | | | |
|---|---|---|---|---|---|
| 3,577,637 | A * | 5/1971 | Braginetz | .................... | 30/162 |
| 4,005,525 | A * | 2/1977 | Gringer | ....................... | 30/125 |
| 4,091,537 | A * | 5/1978 | Stevenson, Jr. | ............... | 30/286 |
| 4,939,839 | A * | 7/1990 | Gorst | .......................... | 30/125 |
| 4,953,293 | A * | 9/1990 | Sterlacci | ...................... | 30/124 |
| 5,604,984 | A * | 2/1997 | Shepherd et al. | .............. | 30/125 |
| 5,909,930 | A * | 6/1999 | Ragland et al. | ............... | 30/125 |
| 5,960,545 | A * | 10/1999 | Shepherd et al. | .............. | 30/125 |
| 6,233,832 | B1 * | 5/2001 | Berns | .......................... | 30/162 |
| 6,678,958 | B1 * | 1/2004 | Budrow | ....................... | 30/125 |
| 6,966,113 | B2 * | 11/2005 | Fossella | ....................... | 30/162 |
| 7,395,600 | B2 * | 7/2008 | Fossella | ....................... | 30/162 |
| 7,418,784 | B2 * | 9/2008 | Fossella | ....................... | 30/162 |
| 2005/0028380 | A1 * | 2/2005 | Fossella | ....................... | 30/162 |
| 2006/0048389 | A1 * | 3/2006 | Votolato | .......................... | 30/2 |

FOREIGN PATENT DOCUMENTS

| | | | |
|---|---|---|---|
| EP | 611634 A1 * | 8/1994 | |
| FR | 2697194 A1 * | 4/1994 | |
| WO | PCT/CA96/00696 | 5/1997 | |
| WO | PCT/US02/20558 | 2/2003 | |

* cited by examiner

*Primary Examiner*—Jason Daniel Prone
*Assistant Examiner*—Jennifer Swinney
(74) *Attorney, Agent, or Firm*—Skinner and Associates

(57) ABSTRACT

A knife comprises a body, a feed blade store, a return blade store, a feed path along which a blade can be fed from the feed blade store to an operative position, and from the operative position to the return blade store, and control means operable to ensure that a returning blade is returned to the return blade store.

11 Claims, 5 Drawing Sheets

KNIFE

This invention relates to a knife, and in particular to a knife of the type having replaceable blades.

Knives of the kind described above typically comprise a multi-part body or housing carrying a blade having an exposed cutting edge. When the cutting edge of the blade becomes blunt, the housing is opened, and the blade rotated such that a second cutting edge thereof previously located within the housing is exposed for use, the previously exposed cutting edge now being located within the housing. When both cutting edges have been used, the blade is replaced, and the housing may be designed in such a manner as to permit one or more spare blades to be located therein.

In order to minimise the risk of injury, it is desirable to be able to move the blades to permit replacement of a blunt cutting edge without exposing the sharp cutting edge of a blade.

According to the present invention there is provided a knife comprising a body, a feed blade store, a return blade store, a feed path along which a blade can be fed from the feed blade store to an operative position, and from the operative position to the return blade store, and control means operable to ensure that a returning blade is returned to the return blade store.

The feed and return blade stores may be defined by recesses formed in the body. Alternatively, they may comprise housings securable to or receivable in the body. The feed and return blade stores may comprise parts of a single housing, if desired.

The control means may comprise diverter means operative to direct return blade movement to the return blade store. For example, the diverter means could comprise one or more leaf springs.

Alternatively, the control means may be adapted to move the feed and return blade stores relative to the feed path so as to direct a returning blade to the return blade store. The blade stores may be translatable or rotatable relative to the body.

The blade stores may be removable and may be located on opposite sides of the path of movement, such that interchanging the blade stores rotates the blades relative to the knife body, the blade stores covering the cutting edges of the blades during this operation, thus reducing the risk of injury. Alternatively, they may be fixed in position.

Each blade store is conveniently adapted to store a plurality of blades, biasing means, conveniently within at least one of the blade stores, being provided to urge the blades towards the path of movement.

Where the blade stores are removable, they are conveniently located within corresponding recesses provided in the body, and doors or covers may be provided to cover the blade stores.

The path of movement is conveniently defined by one or more grooves or recesses provided in the body. An actuator is preferably provided to move the blade. The actuator may include projections arranged to engage in openings formed in the blade.

The body may include a guard located adjacent the blade, when the blade is in its operative position, restricting access to the blade. As a consequence, the risk of injury to the user or damage to goods located in packages to be opened using the knife can be reduced. The guard may comprise one or more retractable side guards. Alternatively, it may comprise a fixed side guard arranged to overlie a surface of a box or carton to be opened in use. The fixed side guard may be of substantially part-circular shape.

The invention also relates to a knife comprising a blade mounted in a body and a side guard of substantially circular or part-circular shape overlying an exposed side face of the blade, the side guard being spaced from the blade. The side guard may be fixed relative to the blade. Alternatively it may be moveable to adjust the exposure of the blade and/or to adjust the handedness of the knife.

The invention will further be described, by way of example, with reference to the accompanying drawings, in which.

Figure 3:
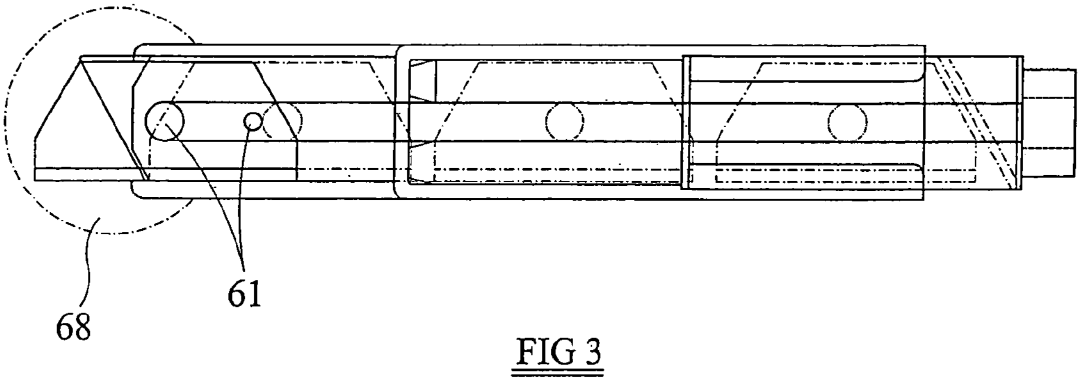
FIGS. 3 to 5 are views illustrating an alternative knife design.
Figure 4:
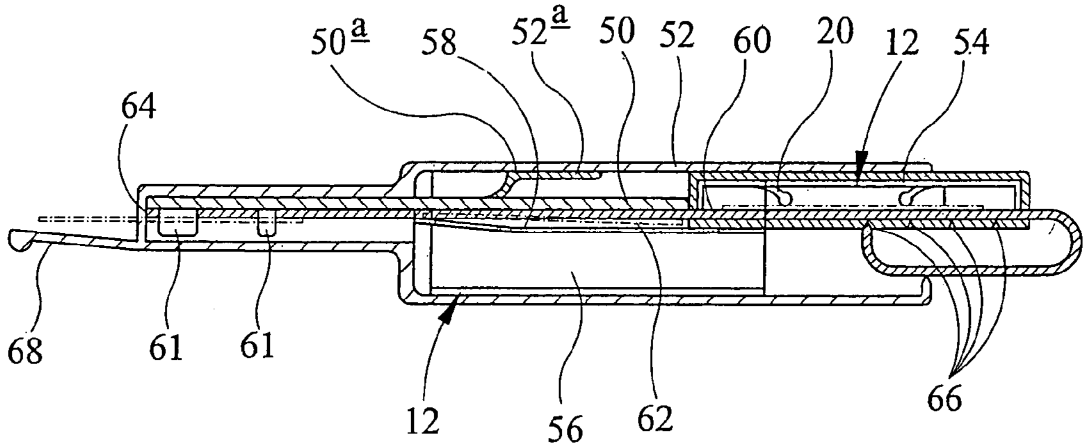
Figure 5:
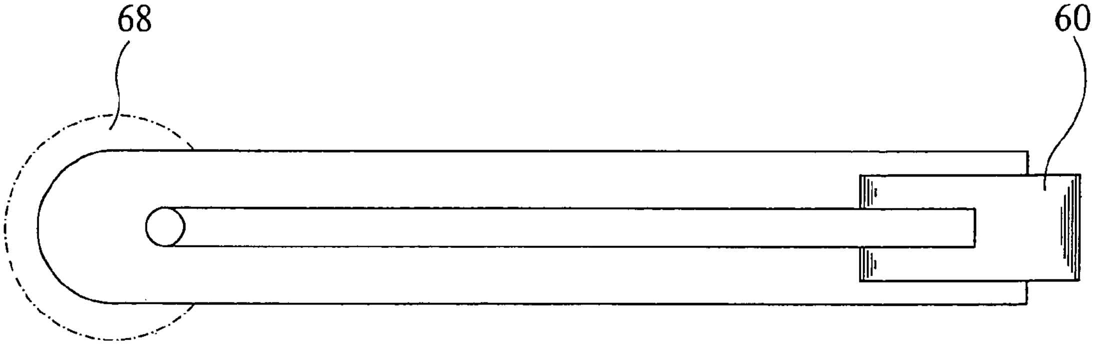

FIGS. **6*a* to 6*e* are diagrams illustrating operation of the knife of FIGS. 3 to 5; and FIGS. 7 to 11** are views of further knife designs.

Figure 1:
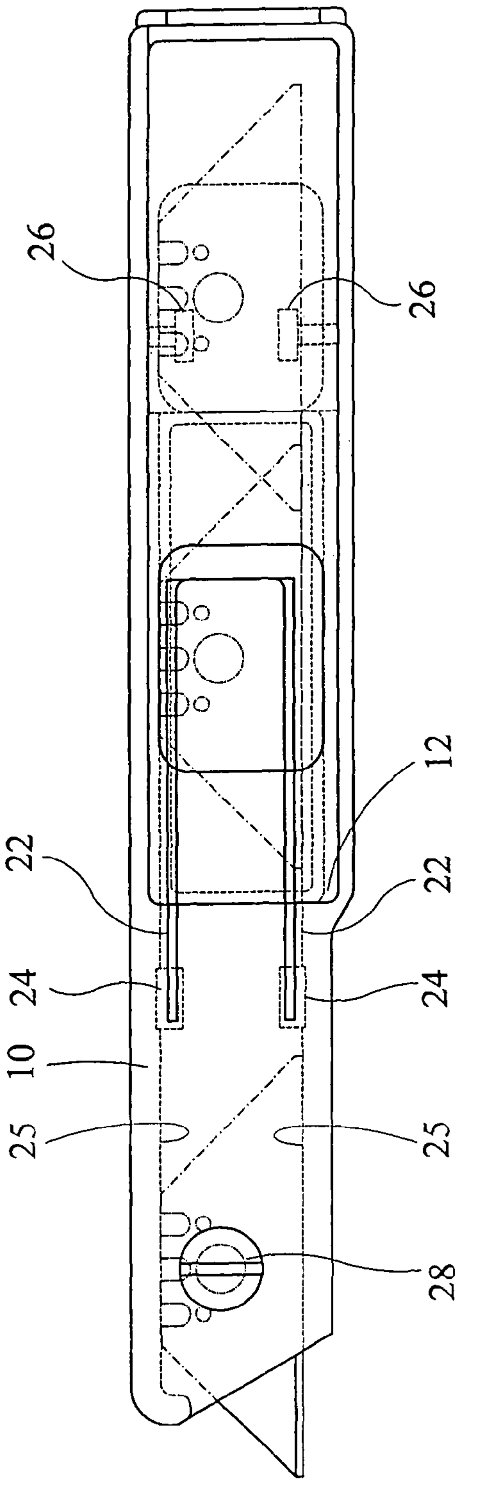
FIG. 1 is a diagrammatic side view of a knife in accordance with an embodiment of the invention.
Figure 2:
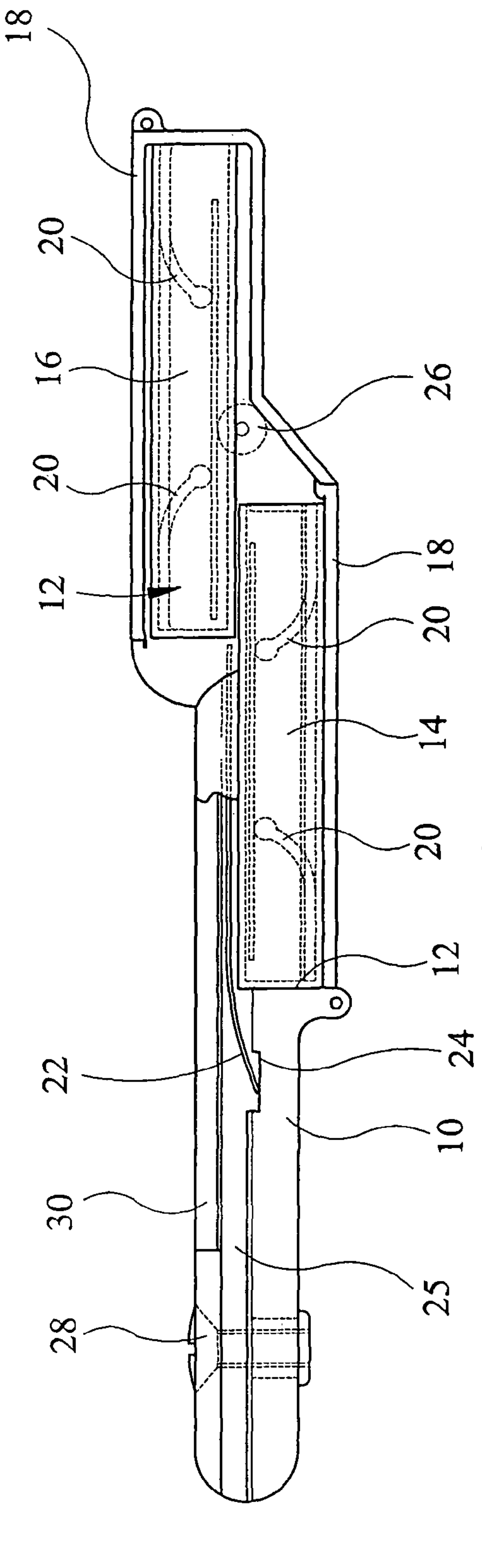
FIG. 2 is a diagrammatic plan view of the knife of FIG. 1.

The knife illustrated in FIGS. 1 and 2 comprise a plastics moulded body 10 defining recesses 12 within which removable blade stores in the form of housings or cartridges 14, 16 are located. The body 10 is designed to include formations co-operable with projections formed integrally with a pair of doors 18 to pivotally mount the doors 18 to the body 10. The doors 18 are movable between closed positions (as illustrated in FIG. 2) in which the cartridges 14, 16 are housed within the body 10 and open positions (not shown) in which the cartridges 14, 16 can be removed from the body 10. In order to retain the doors 18 in their closed positions, the doors 18 are provided with integrally moulded pips which are receivable within correspondingly shaped recesses formed in the body 10, the doors 18 being sufficiently flexible to allow the pips to ride out of the corresponding recesses to allow the doors 18 to be opened.

Each of the blade cartridges 14, 16 takes the form of a plastics moulded housing of generally rectangular shape having, adjacent one side thereof, a pair of slits through which blades can be introduced or removed from the blade cartridge. As shown most clearly in FIG. 2, each blade cartridge 14, 16 is provided with resilient biasing means 20 urging the blades contained within that cartridge 14, 16 towards the said side thereof to allow removal thereof through the slits. The side of each blade cartridge 14, 16 with which the slits are associated is provided with an opening permitting access to the blade located adjacent thereto within the blade cartridge. Conveniently, each cartridge 14, 16 is capable of storing a plurality, say six, of blade.

Diverter means in the form of a pair of leaf spring arms 22 are located within the body 10, the leaf spring arms 22 being resiliently biased into recesses 24 provided within the body 10.

As illustrated most clearly in FIG. 2, the body 10 is shaped to define channels or grooves 25 defining a feed path or path of movement of a blade from the blade cartridge 14 (the feed store) towards an operative position, and from the operative position towards the second blade cartridge 16 (the return store). The positioning of the leaf spring arms 22 is such that when a blade is moved from the first blade cartridge 14 towards the operative position, the leaf spring arms 22 are deflected out of the recesses 24 by the movement of the blade. Once the blade has completely passed the leaf spring arms 22, the leaf spring arms 22 will return into the recesses 24 such that movement of the blade away from the operative position will cause the blade to ride over the leaf spring arms 22 forcing the blade to continue along the path of movement towards the second blade cartridge 16.

A pair of rollers 26 are provided within the body 10, the rollers 26 projecting through the opening of the second blade cartridge 16 holding the blades located therein against the action of the biasing means 20 of the blade cartridge 16 such that when a blade moves along the path of movement towards the second blade cartridge, introduction of the blade into the second blade cartridge is not impeded by the presence of the resilient biasing means 20. Although in the embodiment illustrated, the blades located within the second blade cartridge 16 are held against the action of the biasing means 20 by rollers 26, it will be appreciated that other techniques may be used for holding the blades against the action of the resilient biasing means 20. For example, appropriate skids may be provided.

Depending upon the location of the rollers 26 and the location of the biasing means 20, it is possible that, when no blades are present within the second blade cartridge 16, the rollers 26 may not deflect the biasing means 20 to an extent sufficient to permit the unimpeded introduction of a blade into the cartridge. In order to ensure the correct operation of the knife in this regard, a blade or a 'dummy blade' may be located within the blade cartridge 16 at all times.

In order to ensure that once a blade occupies the operative position, it is held there to permit use of the knife, a blade retainer in the form of a screw 28 is provided. The screw is held in the position illustrated during use of the knife, but when the blade of the knife is to be replaced, the screw is released to allow movement of the blade from the operative position to the second blade cartridge 16 and then to permit blade to be moved from the first blade cartridge 14 to the operative position. Once the blade has reached the operative position, the screw 28 is re-secured to hold the blade in position. Clearly, although the use of a screw is described and shown in the drawings, other techniques for retaining a blade in an operative position may be used. Further, a mechanism may be provided to permit control over the length of the blade projecting from the body, if desired.

In order to ensure that blades cannot be removed from the body 10 when the screw 28 is released, one or more of the grooves 25 are conveniently shaped to terminate short of the end of the body 10, thus the blades are held captive within the body 10.

Prior to use, the first blade cartridge 14 will contain a number of new double-ended blades, and the second blade cartridge 16 will be empty. A blade from the first blade cartridge 14 is moved past the leaf spring arms 22 to the operative position and secured in that position using the screw 28. Movement of the blade from the first blade cartridge 14 to the operative position is achieved manually, an operator using his thumb or finger to access a side surface of the blade through a slot 30 formed in the body 10 and through the opening of the first blade cartridge 14 to slide the blade along the grooves defining the blade path of movement to the operative position. Once the blade has been secured in the operative position, the knife is ready for use.

After the knife has been used for some time, if it is thought that the cutting edge of the blade has become blunt, then the screw 28 is released and the blade is moved from the operative position along the blade path of movement by the operator, the blade riding over the leaf spring arms 22 so that the blade continues to move along the path of movement towards the second blade cartridge 26. If the second blade cartridge 16 is empty then the introduction of a blade thereto is relatively easy. If one or more blades are already located within the blade cartridge 16, then in order to ensure that those blades do not impede the introduction of further blades into the blade cartridge 16, the rollers 26 hold the blades already present within the blade cartridge 16 against the action of the resilient biasing means 20. After location of the used blade within the second blade cartridge 16, a fresh blade can be moved from the first blade cartridge 14 to the operative position and secured in the operative position using the screw 28 ready for use.

When all of the blades from the first blade cartridge 14 have been used, the blade cartridges 14, 16 can be removed from their respective recesses 12 by opening the doors 18. The blade cartridges can then be interchanged. Such switching of the blade cartridges 14, 16 results in the blades being orientated such that the unused parts of the cutting edges of the blades will be exposed from the body when the blades are moved, in turn, to the operative position. After both parts of the cutting edges of all of the blades have been used, the empty blade cartridge is moved to the position of the blade cartridge 16 in FIG. 2 and a new blade cartridge containing a plurality of new blades is introduced into the recess which, in FIG. 2, contains the first blade cartridge 14. The blade cartridge containing all of the used blades can be disposed of safely as all of the blades are located within the blade cartridge, thus no cutting edges are exposed.

It will be appreciated that the knife of the present invention is advantageous in that the cutting edges of the blades only become exposed when the blades are located in the operative position. During the operation of replacement of the blades, there is little risk of injury to the operator as the only parts of the blade which the operator contacts are the side surfaces of the blades, the cutting edges of the blades being guarded by the body 10.

Although in the arrangement described hereinbefore, the blades are moved manually, the operator contacting a side surface of the blade to be moved, the invention is also applicable to knives having some form of mechanism for moving the blades between the cartridges and the operative position.

One such mechanism is included in the knife of FIGS. 3 to 6. Although the construction of the knife shown in FIGS. 3 to 6 is quite different to that of FIGS. 1 and 2, the manner in which it operates is very similar. The knife of FIGS. 3 to 5 comprises a body 50 upon which a sleeve 52 is mounted. The body and sleeve together form a housing in which blade housings 54, 56 are located. Diverter means 58 in the form of spring arms are provided as described hereinbefore.

Figure 6A:
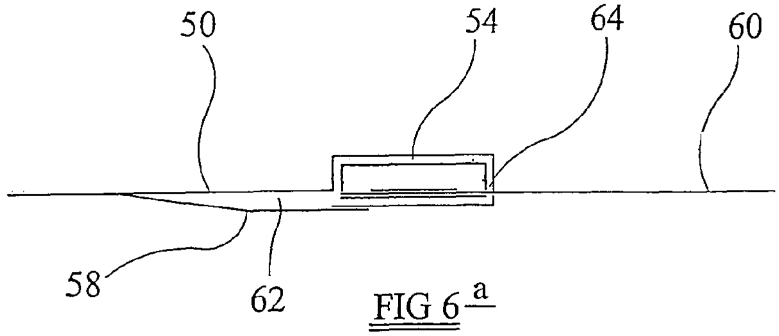
Figure 6B:
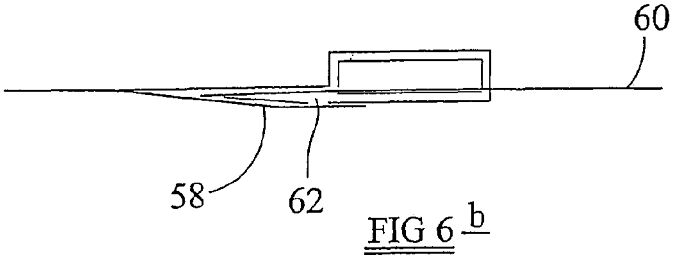
Figure 6C:
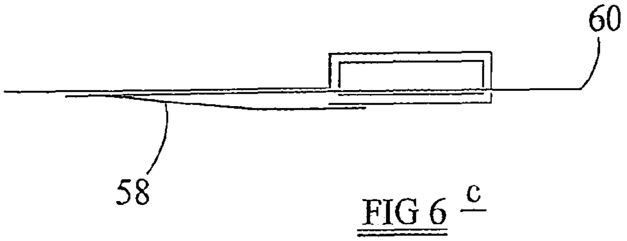
Figure 6D:
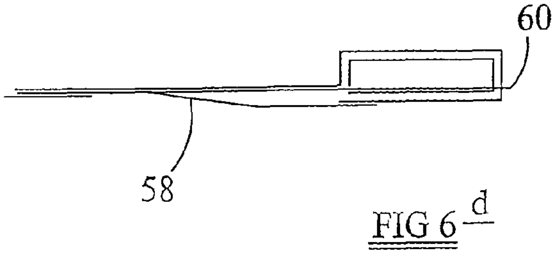

An actuator member 60 is slidable within the body 50, the actuator member 60 being movable between a retracted position and an operative position. In use, starting from a position in which all of the blades are located within the blade housings 54, 56 and the actuator member 60 is in its fully retracted position (see FIG. 6*a*), movement of the actuator member 60 causes an end face thereof to abut an end of one of the blades located in the housing 54, driving that blade out of the housing 54 as movement continues. Once out of the housing 54, the blade can drop into space 62 and then remain stationary whilst movement of the actuator member 60 continues, such movement resulting in projections 61 formed on the actuator member 60 engaging in openings formed in the blade. This position is shown in FIG. 6*b*. Continued movement of the actuator member 60 drives the blade past the diverter means 58 as shown in FIG. 6*c* to its operative position as shown in FIG. 6*d*. The projections 61 are of different sizes so that the first, large projection rides over the first, small opening that it reaches, continuing until it reaches and engages in a second, larger opening at which point the second, small projection engages in the smaller opening. The engagement of the projections in the openings resists tilting movement of the blade.

As best shown in FIG. 4, an end 64 of the actuator member 60 is selectively engageable in a series of grooves 66 so as to enable the actuator member 60 to be held in a range of positions, thereby allowing the blade to be held in a series of different operative positions at which the blade projects from the housing by a range of distances.

Figure 6E:
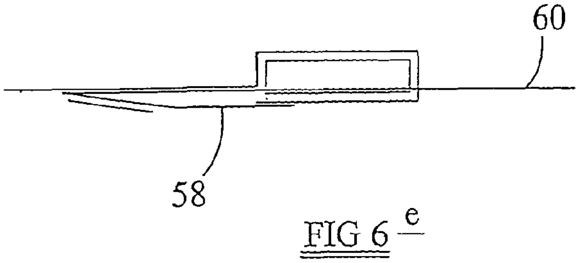

When it is decided that the blade needs replacement, the actuator member 60 is drawn back towards its retracted position. Such movement retracts the blade, the diverter means 58 diverting the blade into the blade housing 56, disengaging the blade from the projections 61. This position is shown in FIG. 6*e*. Retraction of the actuator member 60 continues until the retracted position illustrated in FIG. 6*a* is attained.

The sleeve 52 conveniently defines a guard region 68 lying alongside the blade, in use, restricting access thereto thus reducing the risk of injury or damage to products located in boxes or cartons to be opened using the knife. The guard region 68 is conveniently of substantially part-circular form, but could be of other forms. In use, it may be adapted to run along a surface of a box or carton to be opened, thus holding the blade at a fixed distance from the surface. The blade is preferably not pointed so as to reduce the risk of puncture-type injuries.

The sleeve 52 is conveniently snap-fitted to the body 50 by means of a resilient projection 50*a* being receivable in an opening 52*a* formed in the sleeve 52. This permits separation of the sleeve 52 from the body 50 to gain access to the blade housings 54, 56, if desired. It may also allow fitting of the sleeve 52 in a different position, or fitting of a different sleeve, for example to convert the handedness of the knife. Alternatively, the body and sleeve may be permanently secured together. Consequently, the knife may be suitable for use in food preparation areas.

Figure 7:
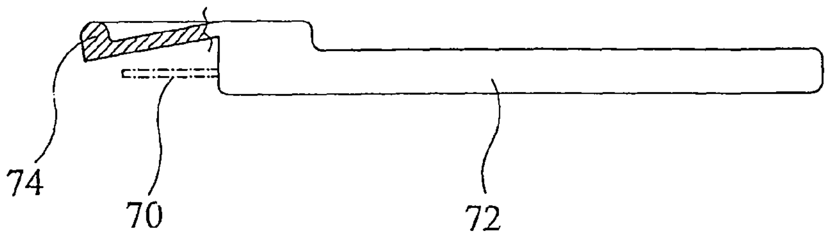
Figure 8:
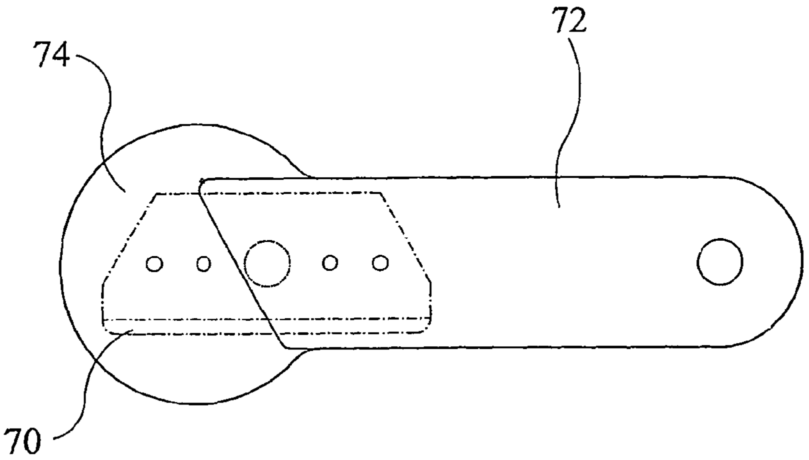

FIGS. 7 and 8 illustrate an alternative design in which a blade 70 is permanently secured to a moulded body 72 having an integral side guard 74 similar to that described hereinbefore. Again this may be designed to be suitable for use in food preparation areas.

Figure 9:
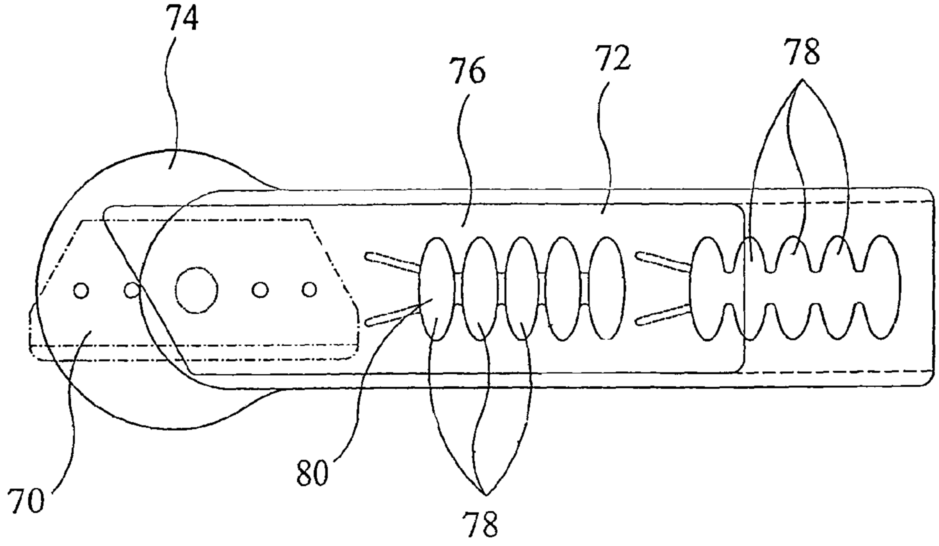

FIG. 9 illustrates an arrangement similar to FIGS. 7 and 8 but in which the side guard 74 is provided on a movable sleeve 76. The sleeve 76 is provided with a series of openings 78, a projection 80 formed on the body 72 being selectively engageable in the openings 78 to allow the sleeve 76 to be fitted to the body 72 at a range of positions, thereby allowing a range of blade projection distances to be provided. The sleeve 76 is conveniently reversible to allow the knife to be switched for left and right-handed operation. The sleeve 76 may also be removed for cleaning of the guard. The body 72 may be designed to allow blade replacement and may be split to allow cleaning/sterilisation. Conveniently, each side of the body 72 is provided with a pair of projections 80, associated openings 78 being provided on the sleeve 76. Such an arrangement may serve to reduce the risk of accidental release of the body from the sleeve.

The sleeve 76 could be a one-piece moulding. However, there may be situations where it is preferred to mould the sleeve 76 in two parts (or in more pieces) and to weld the parts to one another.

If, in use, the knife of FIGS. 1 and 2 or FIGS. 3 to 6 is likely to be left for periods of time, then it may be advantageous to provide an arrangement whereby the blade is not exposed when the knife is not in use. One possibility may be to provide a mechanism whereby the leaf spring arms 22 can be deflected from the recesses 24 to permit the blade to be returned to the first blade cartridge if the cutting edge of the blade has not yet become blunt. Alternatively, the blade may simply be retracted into an intermediate position in which the cutting edge thereof lies entirely within the body.

Figure 10:
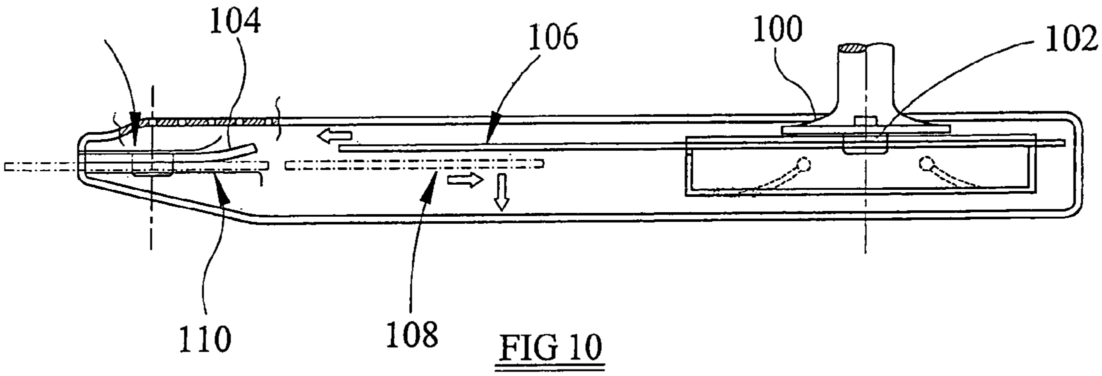

FIG. 10 illustrates a knife that, in many respects, is similar to some of the knives described hereinbefore, and only the significant differences will be described.

One important difference is the manner in which the blades are moved between the blades stores and the operative position. In FIG. 10, a slide 100 is provided, the slide 100 having a projection 102 formed thereon dimensioned to be receivable in an opening formed in the blade 110. The projection 102 is sufficiently small that, in use, it does not project completely through the opening, at least when the blade is located in the feed blade store. It will be appreciated that movement of the slide 100, with the projection 102 located in the opening of the blade, drives the blade for movement relative to the body, both in the feed direction from the feed blade store towards the operative position and in a return direction from the operative position to the return blade store. Stops may be provided to allow the slide to be held in one or more desired positions to permit control over the length of the blade projecting from the body.

The slide 100 may include an internal spring arranged to bias the projection 102 towards the face of the blade 110, if desired.

A track along which the slide 100 moves may be contoured to hold the slide 100 in the desired position relative to the blade at all times.

Another difference is that, in this embodiment, the control means comprises a skid or guide 104 with which the blade engages on approaching the operative position, the operative position, the skid or guide 104 orientating the blade so that return movement of the slide 100 and the blade returns the blade behind a guide or track 106 to the return blade store 108. The guide or track 106 may be defined, in part, by a wall defining the return blade store 108.

If desired, two (or more) feed stores may be provided, permitting the user to select, for example, what type of blade to use.

The blades may, if desired, be of the snap-off type to allow removal of a blunted part thereof.

A spring return mechanism may be provided to retract the blade from the operative position into the body other than when the user applies a load to, for example, the slide. The slide could be designed to move along the top rather than a side of the body, if desired.

It will be appreciated that the control means could take a range of other forms, including manually actuable arrangements to control to which store a returning blade is fed.

A further possibility combines the two blade stores into a single housing 112. For example, the housing 112 may have a feed side 114 (and adjacent feed store) and a return side 116 (and adjacent return store). Deflector means 118 could be provided as described hereinbefore to return a blade to the return store (see FIG. 11A). Alternatively, blades being fed and returned may follow the same path 120, the control means moving the housing 112 to determine whether blades are fed or returned to the feed store or return store sides of the housing. The movement may be sliding movement (see FIG. 11B), laterally of the feed/return path, or rotary movement (see FIG. 11C).

Figure 11A:
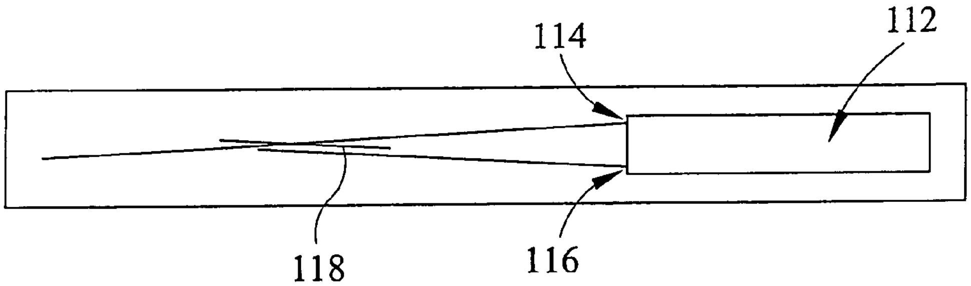
Figure 11B:
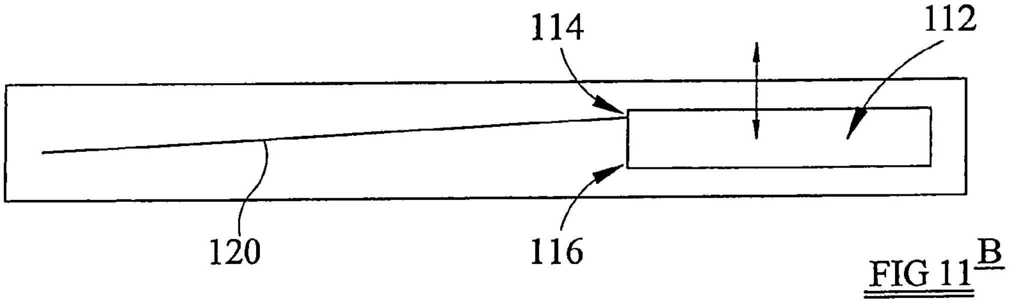
Figure 11C:
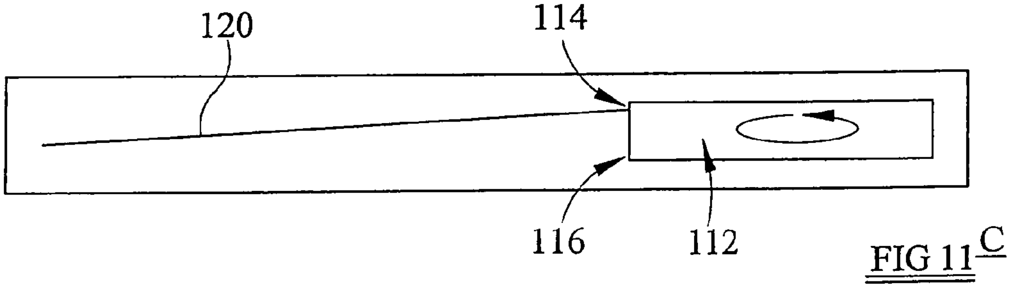
Figure 11D:
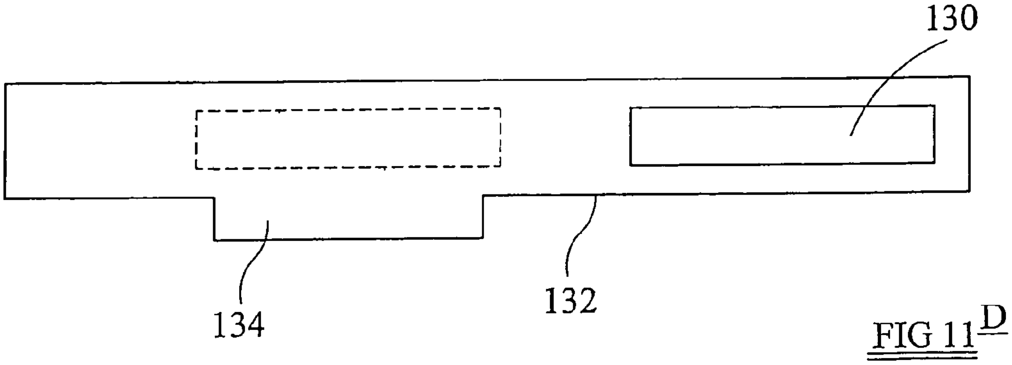

FIG. 11D illustrates a variant in which two blade stores are provided. A first, feed store comprises a movable cartridge 130 movable longitudinally of the body 132 between a feed position (shown in broken lines) in which a blade can be fed by an appropriate mechanism, slide or the like to an operative position, and a return position (shown in full lines) in which a return store 134 is open so that a returning blade is fed to the return store. Alternatively, rather than use a moving cartridge 130 to bridge the return store 134, a separate, movable bridge component may be provided.

It will be appreciated that a wide range of modifications and alterations may be made to the arrangements described hereinbefore without departing from the scope of the invention.

The invention claimed is:

1. A knife comprising a body, a feed blade store comprising a first housing securable to the body, a return blade store comprising a second housing securable to the body, the first and second blade store housings being interchangeable, a feed path along which a blade is fed from the feed blade store to an operative position, and from the operative position to the return blade store, the feed blade store and the return blade store being located on opposite sides of the feed path, and diverter means located in the feed path between the feed blade store and the operative position, the diverter means operable to divert a returning blade to the return blade store, and to prevent return movement of the returning blade back to the feed blade store, whereby the diverter means deflects blades away from the side of the feed blade store by movement of the blade from the feed blade store to the operative position, and whereby the diverter means causes a blade moving from the operative position to ride over the diverter means and towards the side of the return blade store.

2. A knife according to claim 1, wherein the diverter means comprises one or more leaf springs.

3. A knife according to claim 1, wherein the feed path is defined by one or more grooves or recesses provided in the body.

4. A knife according to claim 1, further comprising an actuator operable to move the blade.

5. A knife according to claim 4, wherein the actuator includes projections arranged to engage in openings formed in the blade.

6. A knife according to claim 1, wherein the body includes a guard located adjacent the blade, when the blade is in its operative position, restricting access to the blade.

7. A knife according to claim 6, wherein the guard comprises one or more retractable side guards.

8. A knife according to claim 6, wherein the guard comprises a fixed side guard arranged to overlie a surface of a box or carton to be opened in use.

9. A knife according to claim 8, wherein the fixed side guard is of substantially part-circular shape.

10. A knife comprising a body, a feed blade store adapted to store a plurality of blades, the feed blade store comprising a first housing securable to the body, at least one blade, a return blade store comprising a second housing securable to the body, the first and second blade store housings being interchangeable, a feed path along which a blade moves from the feed blade store to an operative cutting position, and moves from the operative cutting position to the return blade store, the feed blade store and the return blade store being located on opposite sides of the feed path, and at least one diverter spring located in the feed path, the diverter spring having a predetermined curve and a distal end disposed in a recess in the feed path between the feed blade store and the operative position, whereby the diverter spring distal end deflects out of the recess, away from the side of the feed blade store, to permit the blade moving from the feed blade store to pass to the operative cutting position and whereby the diverter spring forces the blade moving from the operative cutting position to ride over it and towards the side of the return blade store and pass to the return blade store.

11. A knife, comprising:

a. a body having an exterior and an interior, the interior forming:
   i. a feed blade store storing a plurality of new blades, the feed blade store comprising a first housing receivable in the body,
   ii. a return blade store adapted for storing used blades, the return blade store comprising a second housing receivable in the body, the first and second housings being interchangeable, and
   iii. a feed path along which a blade moves from the feed blade store to an operative cutting position, and moves from the operative cutting position to the return blade store, the feed blade store and the return blade store being disposed on opposite sides of the feed path, b. a pair of leaf-type diverter springs located in the feed path, each diverter spring having a predetermined curve and a distal end disposed in a recess in the feed path between the feed blade store and the operative position, the diverter springs being oriented parallel to each other and separated a predetermined distance, and c. whereby during operation of the knife the diverter spring distal end deflects out of the recess to permit the blade moving from the feed blade store to pass to the operative cutting position and whereby the diverter spring forces the blade moving from the operative cutting position to ride over it and pass to the return blade store.

* * * * *